(12) United States Patent
Spray et al.

(10) Patent No.: US 11,149,489 B2
(45) Date of Patent: Oct. 19, 2021

(54) TRANSMISSION FOR AN ARCHITECTURAL-STRUCTURE COVERING

(71) Applicant: Hunter Douglas, Inc., Pearl River, NY (US)

(72) Inventors: Jeffrey L. Spray, Erie, CO (US); Mark Schwandt, Thornton, CO (US); Paul D. Mischo, Denver, CO (US)

(73) Assignee: HUNTER DOUGLAS INC., Pearl River, NY (US)

( * ) Notice: Subject to any disclaimer, the term of this patent is extended or adjusted under 35 U.S.C. 154(b) by 118 days.

(21) Appl. No.: 16/795,892

(22) Filed: Feb. 20, 2020

(65) Prior Publication Data
US 2020/0284089 A1    Sep. 10, 2020

Related U.S. Application Data

(60) Provisional application No. 62/813,886, filed on Mar. 5, 2019.

(51) Int. Cl.
*E06B 9/24* (2006.01)
*F16H 9/02* (2006.01)
*F16H 57/00* (2012.01)

(52) U.S. Cl.
CPC .................. *E06B 9/24* (2013.01); *F16H 9/02* (2013.01); *F16H 57/0025* (2013.01)

(58) Field of Classification Search
CPC .......... E04B 9/24; F16H 9/02; F16H 57/0025; E06B 9/322
USPC ....................................................... 160/170
See application file for complete search history.

(56) References Cited

U.S. PATENT DOCUMENTS

| | | | | |
|---|---|---|---|---|
| 2,420,301 A | * | 5/1947 | Cusumano | E06B 9/305 |
| | | | | 160/170 |
| 2,824,608 A | * | 2/1958 | Etten | E06B 9/322 |
| | | | | 160/170 |
| 4,005,764 A | * | 2/1977 | Terzian | F03G 1/00 |
| | | | | 185/37 |
| 4,245,687 A | * | 1/1981 | Vecchiarelli | E06B 9/307 |
| | | | | 160/177 R |
| 4,456,049 A | * | 6/1984 | Vecchiarelli | E06B 9/307 |
| | | | | 160/107 |
| 6,536,503 B1 | | 3/2003 | Anderson et al. | |
| 6,622,769 B2 | * | 9/2003 | Judkins | E06B 9/322 |
| | | | | 160/84.05 |

(Continued)

FOREIGN PATENT DOCUMENTS

WO        2005009875 A2    2/2005

*Primary Examiner* — Beth A Stephan
(74) *Attorney, Agent, or Firm* — Kacvinsky Daisak Bluni PLLC

(57) ABSTRACT

A transmission for use with an architectural-structure covering for moving a covering of the architectural-structure covering between an extended position and a retracted position is disclosed. The transmission may include a drive shaft, a driven shaft including a tapered shaft portion, a transmission cord operatively coupled to the drive shaft and the driven shaft for transferring rotation between the drive shaft and the driven shaft, and a geared assembly. The geared assembly may include an intermediate member, first and second gears coupled to the intermediate member, a first shaft, and an end cover coupled to the intermediate member and the housing.

19 Claims, 3 Drawing Sheets

(56) References Cited

U.S. PATENT DOCUMENTS

| | | | | |
|---|---|---|---|---|
| 6,808,002 B2 * | 10/2004 | Colson | ................... | E06B 7/086 |
| | | | | 160/176.1 R |
| 7,624,785 B2 * | 12/2009 | Yu | .......................... | E06B 9/322 |
| | | | | 160/171 |
| 7,703,499 B2 * | 4/2010 | Tait | ........................ | E06B 9/262 |
| | | | | 160/84.01 |
| 7,886,803 B2 * | 2/2011 | Anderson | ............... | E06B 9/262 |
| | | | | 160/170 |
| 9,121,221 B2 * | 9/2015 | Cheng | ................... | E06B 9/322 |

\* cited by examiner

TRANSMISSION FOR AN ARCHITECTURAL-STRUCTURE COVERING

CROSS-REFERENCE TO RELATED APPLICATIONS

This is a non-provisional of, and claims the benefit of the filing date of, U.S. provisional patent application No. 62/813,886, filed Mar. 5, 2019, entitled "Transmission for an Architectural-Structure Covering," which application is incorporated by reference herein in its entirety.

FIELD OF THE DISCLOSURE

The present disclosure relates generally to the field of architectural-structure coverings, and more particularly to a transmission used in combination with an operating system for moving a covering of the architectural-structure covering between extended and retracted positions.

BACKGROUND

Architectural-structure coverings may selectively cover an architectural structure such as, for example, a window, a doorway, a skylight, a hallway, an archway, a portion of a wall, etc. (collectively an architectural structure without the intent to limit). Architectural-structure coverings may include a covering that can be extendable and retractable, for example, vertically extendable or retractable (e.g., able to be lowered or raised, respectively, in a vertical direction) between an extended position and a retracted position for obscuring and exposing the underlying architectural structure. The architectural-structure covering may further include a bottom rail attached to a lower edge of the covering. The bottom rail may be utilized to add weight along the lower edge of the covering to encourage the covering to drop by gravity during deployment. In addition, the architectural-structure covering may also include a head-rail for concealing a top portion of the architectural-structure covering.

To move the covering between the extended and retracted positions, some architectural-structure coverings include a rotatable member (e.g., a rod or a roller). In use, rotation of the rotatable member in a first direction may retract the covering while rotation of the rotatable member in a second, opposite direction may extend the covering. In various embodiments, the covering of the architectural-structure covering may be gathered, stacked or accumulated onto the bottom rail as the bottom rail is being retracted such that in the fully retracted position, the covering is positioned adjacent to the rotatable member. For example, some retractable coverings include a plurality of slats that are raised or lowered by lift cords that are wrapped about or unwrapped from the rotatable member. The lift cords are coupled to the covering, the bottom rail, and the rotatable member. In use, rotation of the rotatable member in a first direction wraps the lift cords about the rotatable member causing the bottom rail and hence the covering to retract or raise adjacent to the rotatable member, while rotation in a second direction causes the lift cords to unwrap about the rotatable member causing the bottom rail and hence the covering to move or lower in an extended configuration. As such, rotation of the rotatable member generally causes movement of the covering of the architectural-structure covering. To actuate movement of the rotatable member, and thus the covering of the architectural-structure covering, an operating system may be operably coupled to the rotatable member.

The operating system may be operatively associated with an operating element, for example, a cord, a chain, a tilt wand, or the like. The operating element may be manipulated by a human operator to move the covering between the extended and retracted positions. Alternatively, the operating system may include a motorized controller to lower or raise a covering portion. For example, a motorized drive motor (e.g., an electric motor) can be provided to move the covering portion between an extended position, and a retracted position. In this embodiment, the operating element may include a hand-held remote or the like. In alternate embodiments, the covering may be moved by gripping the bottom rail of the architectural-structure covering.

As will be appreciated by one of ordinary skill in the art, when raising the covering of the architectural-structure covering, at first only the bottom rail is being raised and the amount of force required is small. As the bottom rail is raised further, more of the covering becomes gathered, stacked or accumulated on top of the bottom rail and thus progressively more force is required to continue to raise the covering. The largest amount of force will be required at the very top when literally the entire, or most of the covering is being raised. By the same token, the greatest amount of force will be required to maintain the covering in its position, as one is fighting against the weight of the entire covering, or most of the covering.

In contrast, when the covering is in the fully extended position, only the bottom rail is supported by, for example, the lift cords. The rest of the weight of the covering is supported by, for example, ladder tape which has tilt cables running to, and supported by, the head rail. Since the weight of the covering not resting on the bottom rail is supported by the head rail (via the ladder tapes), this weight need not be overcome when raising the covering. Only the weight of the bottom rail, and the weight of each successive portion of the covering resting on the bottom rail as it comes into contact with the bottom rail as the covering is raised, need to be overcome.

In essence, the lift cord and the ladder tapes exchange loads as the covering is raised and lowered. The ladder tapes do practically all of the supporting when the covering is extended. As the covering is raised, the weight is shifted from the ladder tapes onto the lift cords as each successive portion of the covering is picked up by the rising bottom rail and thus is no longer supported by the ladder tapes. The implication is that the least amount of force is required to start raising the covering when in the fully extended position, and also the least amount of force is required to maintain the covering in the extended position. Progressively larger force is required to lift and to maintain the position of the covering as the covering is raised until a maximum amount of force is reached at the topmost position, where the covering is fully retracted.

The force required to raise the covering varies directly and approximately linearly with the raising of the covering, increasing from a minimum when the covering is fully lowered to a maximum when the covering is fully raised. This same force also varies directly and approximately linearly with the size and weight of the covering.

As a result, operating systems may be incorporated to assist with the added forces associated with raising the covering of an architectural-structure covering. In some embodiments, the operating system may include a motor such as, for example, a spring motor to provide additional force to balance the weight of the covering so that, when a user raises or lowers the covering, the covering easily moves in the required direction. Similarly, the motor can ensure that the covering maintains its desired position when the user stops raising or lowering the covering. The spring motor preferably is a constant force motor, but as has been observed, the force required to balance the covering varies as the covering is raised and lowered, with the greatest force required in the retracted position and the least force required in the extended position. For this reason, it is usually desirable to incorporate a transmission so that the desired amount of force is provided at all positions of the covering.

One known transmission, described in U.S. Pat. No. 6,536,503, includes, inter alia, a housing, a drive shaft, a driven shaft, and a transmission cord or element. In use, as will be described in greater detail, the driven shaft may be in the form of a tapered driven shaft arranged and configured so that the output force is greater when the covering is in the raised position and the output force is less when the covering is in the lowered position.

It is with respect to these and other considerations that the present improvements may be useful.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Disclosed herein is a transmission for use with an architectural-structure covering, the transmission being arranged and configured to move a covering of the architectural-structure covering between an extended position and a retracted position is disclosed. In use, the transmission assists with balancing the forces associated with raising and lowering the covering of the architectural-structure covering. In use, the transmission may be operatively coupled to a motor such as, for example, a spring motor, which provides additional force required to raise and lower the covering, and to maintain the desired position of the covering. As the spring motor is often arranged and configured as a constant force motor, the transmission may be arranged and configured to alter the supplied force to balance the supplied force against the varying forces of the covering as the covering is raised and lowered.

In one embodiment, a transmission for use with an architectural-structure covering, the transmission being arranged and configured to move a covering of the architectural-structure covering between an extended position and a retracted position is disclosed. The transmission comprises a housing, a drive shaft positioned within the housing, a driven shaft positioned within the housing, the driven shaft including a tapered shaft portion, a transmission element coupled to the drive shaft and the driven shaft, the transmission element being arranged and configured to transfer rotation between the drive shaft and the driven shaft, and a geared assembly coupled to a second end of the driven shaft. The geared assembly including an intermediate member, a first gear coupled to the intermediate member, a second gear coupled to the intermediate member and intermeshed with the first gear, an input/output shaft coupled to the second gear, and an end cover coupled to the intermediate member and the housing, wherein the geared assembly is arranged and configured to couple to the second end of the driven shaft.

In another embodiment, a transmission for use with an architectural-structure covering, the transmission being arranged and configured to move a covering of the architectural-structure covering between an extended position and a retracted position is disclosed. The transmission comprises a housing, a driven shaft positioned within the housing, the driven shaft including a tapered shaft portion, and a geared assembly operatively coupled to a second end of the driven shaft and to the housing, wherein the geared assembly is arranged and configured to couple to the second end of the driven shaft.

DETAILED DESCRIPTION

Figure 1:
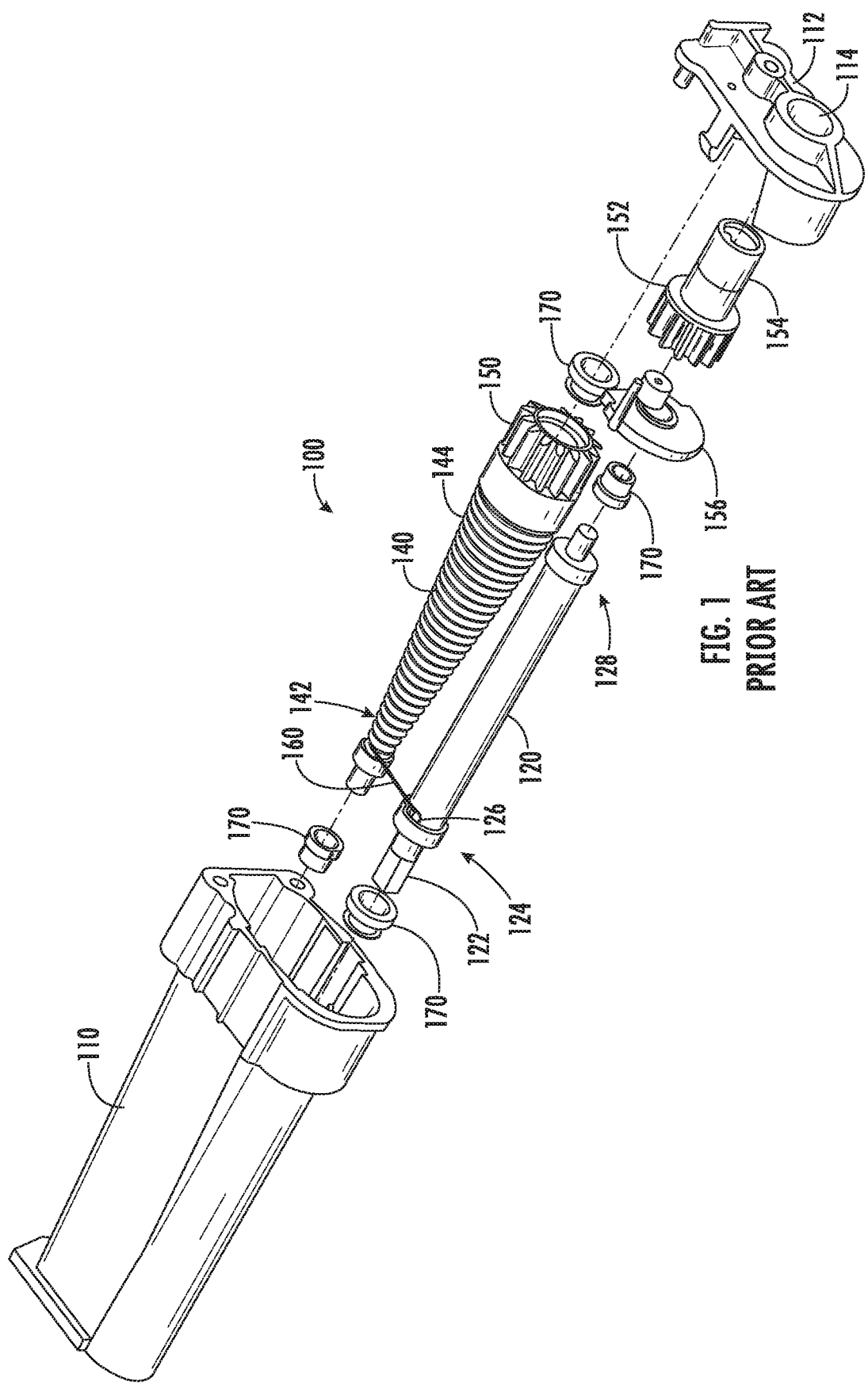
FIG. 1 is an exploded, perspective view of a known transmission.

Embodiments of an example, illustrative transmission for architectural-structure coverings in accordance with various separate and independent principles of the present disclosure will now be described more fully hereinafter with reference to the accompanying drawings, in which embodiments of the present disclosure are presented. The transmission of the present disclosure may, however, be embodied in many different forms and should not be construed as being limited to the embodiments set forth herein. Rather, these embodiments are provided so that this disclosure will convey certain aspects of the transmission to those skilled in the art. In the drawings, like numbers refer to like elements throughout unless otherwise noted.

In use, the transmission may be incorporated into an architectural-structure covering to assist with balancing the forces associated with raising and lowering the covering of the architectural-structure covering. In some embodiments, the transmission may be operatively coupled to a motor such as, for example, a spring motor, which provides additional force required to raise and lower the covering, and to maintain a desired position of the covering. As the spring motor is often arranged and configured as a constant force motor, the transmission may be arranged and configured to adjust the supplied force of the motor to balance the supplied force against the varying forces of the covering as the covering is raised and lowered.

One known transmission used to affect the desired operation of the covering is illustrated in FIG. 1. As illustrated, the transmission 100 includes a housing 110, a drive shaft 120, a driven shaft 140, and a transmission element, cord, or the like 160 (element and cord used interchangeably without the intent to limit). In use, the drive shaft 120 is arranged and configured to couple to a power module (e.g., spring motor) (not shown) for driving or rotating the drive shaft 120. For example, in one example embodiment, the power module (e.g., spring motor) may include a housing, a spring, a storage spool, and a power spool. In use, the power spool mates with and drives the drive shaft 120 of the transmission 100. It should be understood that the transmission of the present disclosure is not limited to the particular details of the power module (e.g., spring motor) and thus the specific details of the power module (e.g., spring motor) are omitted for the sake of brevity. Additional information on the structure and operation of the power module (e.g., spring motor) and the components thereof, can be found in U.S. Pat. No.

6,536,503 entitled Modular Transport System for Coverings for Architectural Openings", the entire contents of which is hereby incorporated by reference.

As mentioned, the drive shaft 120 is non-rotatably coupled to the power module (e.g., spring motor). For example, as illustrated, the drive shaft 120 may include a non-circular end 122 for coupling to the power module (e.g., spring motor). In this manner, the power module can mate with the drive shaft 120 of the transmission 100 so that rotation from the power module is transferred to the drive shaft 120, and vice-versa.

The driven shaft 140 includes a first end 142, a second end 144, and an intermediate tapered shaft portion. As illustrated, in one embodiment, the tapered shaft portion includes a plurality of threads for receiving the transmission cord 160, as will be described in greater detail below. However, it should be understood that the driven shaft may include a smooth, intermediate shaft portion. In use, the driven shaft 140 is positioned parallel to the drive shaft 120 within the housing 110, with the first end 142 positioned adjacent to a first end 124 of the drive shaft 120 and the second end 144 positioned adjacent to a second end 128 of the drive shaft 120. In one embodiment, as a result of the tapered shaft portion, the second end 144 of the driven shaft 140 has a diameter larger than the diameter of the first end 142. By providing a tapered shaft, the output force of the transmission 100 can be adjusted so that, for example, the output force can be greater when the covering is in the retracted position and less when the covering is in the extended position.

At the second end 144 of the driven shaft 140 (e.g., tapered driven shaft) is a first gear 150. The first gear 150 couples to a second gear 152, which is coupled to a first shaft 154 (e.g., the first shaft 154 may also be referred to herein as an input/output shaft). An intermediate cap 156 may be provided to support and align the ends of the components. In addition, a series of bushings 170 may be incorporated at the ends of the drive shaft 120 and at the ends of the driven shaft 140 to facilitate rotation of the drive shaft 120 and the driven shaft 140.

In use, the transmission 100 has three rotating parts—the drive shaft 120, the driven shaft 140 (e.g., tapered driven shaft), and the first or input/output shaft 154. The drive shaft 120 is operatively coupled to the driven shaft 140 via the transmission cord 160. For example, as illustrated, the drive shaft 120 includes a small hole 126 adjacent to the first end 124 of the drive shaft 120 for receiving a first end of the transmission cord 160. In addition, the second end 144 of the driven shaft 140 includes a small hole (not shown) for receiving a second end of the transmission cord 160. In use, the transmission cord 160 is wound onto the driven shaft 140 (e.g., tapered driven shaft) when the covering is in the extended position. As the covering is raised, the spring motor (not shown) rotates and the drive shaft 120 rotates in a first direction, which, in turn, winds the transmission cord 160 onto the drive shaft 120, causing the driven shaft 140 (e.g., tapered driven shaft) to rotate. Rotation of the driven shaft 140 causes the first gear 150 to rotate, which, in turn, rotates the second gear 152, which rotates the first shaft 154, which rotates a rotatable member (not shown) and winds the lift cords. As previously mentioned, the lift cords are coupled to the covering, the bottom rail, and the rotatable member so that, in use, rotation of the rotatable member in a first direction wraps the lift cords about the rotatable member causing the bottom rail and hence the covering to retract or raise relative to the rotatable member. Conversely, when the covering is extended, the lift cords are unwound, causing the rotatable member to rotate in the opposite direction. This in turn, rotates the first shaft 154, the second gear 152, and the first gear 150 of the transmission 100 in the opposite direction, which causes the driven shaft 140 (e.g., tapered driven shaft) to rotate so as to wind up the transmission cord 160 onto itself, which rotates the drive shaft 120 and rotates or winds the spring motor. In use, the spring motor assists in raising the covering. That is, as the covering is lowered, the weight of the covering and the force of gravity are used to wind up the spring in the power module so that the unwinding of the spring may assist in the raising of the covering.

As illustrated, the transmission 100 may also include an end cover 112 coupled to the housing 110. The end cover 112 may be coupled to the housing 110 by fasteners. In use, the end cover 112 includes an opening 114 through which the first shaft 154 is accessible so that the first shaft 154 may be operatively coupled with the rotatable member of the architectural-structure covering.

In use, by utilizing a tapered shaft for the driven shaft 140, the output force of the transmission 100 is greater when the covering is in the retracted position to assist with (e.g., maintain and/or lift) the covering when the greatest amount of force or weight is present on the bottom rail of the covering and the output force of the transmission 100 is less when the covering is in the extended position (e.g., when the least amount of weight or force is present on the bottom rail). Additional information on the structure and operation of the transmission 100 and the components thereof, can be found in U.S. Pat. No. 6,536,503 entitled Modular Transport System for Coverings for Architectural Openings", the entire contents of which is hereby incorporated by reference.

One common issue with the transmission of FIG. 1 is that the number and complex arrangement of the components generally results in a time-consuming assembly process, generally resulting in high cost, high production time, and potentially reduced quality. Additionally, the transmission of FIG. 1 preferably requires the application of lubricant (e.g., grease) between the moving parts to perform. Additionally, the first and second gears 150, 152 are generally manufactured from zinc, generally using a low precision manufacturing process.

Figure 2:
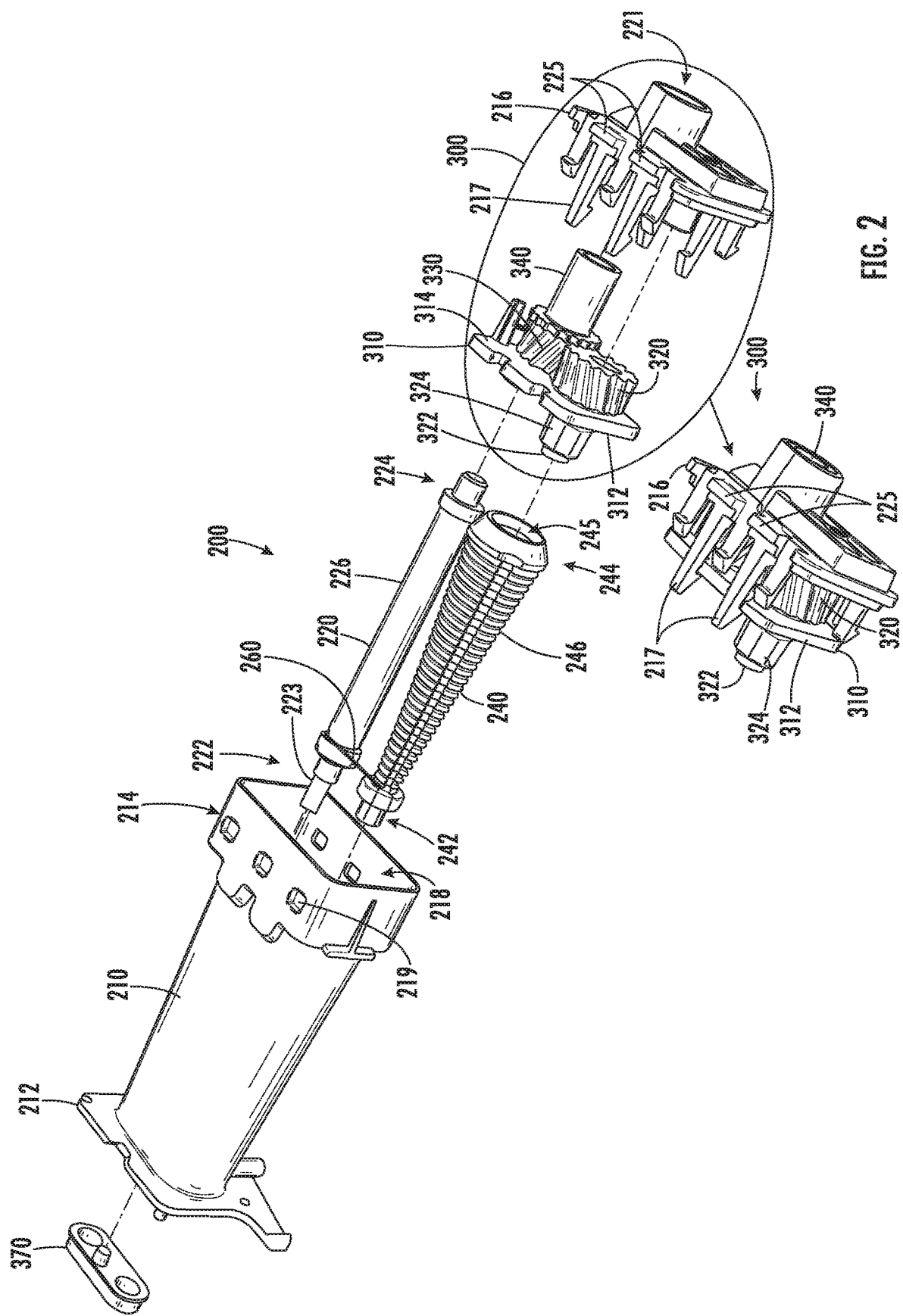
FIG. 2 is an exploded, perspective view of an example embodiment of an improved transmission in accordance with aspects of the present disclosure.

Referring to FIG. 2, in accordance with one aspect of the present disclosure, the transmission 200 includes a housing 210, a drive shaft 220, a driven shaft 240, a transmission element or cord 260, and a geared assembly 300. In the illustrated embodiment, the housing 210 includes a first end 212 for coupling to a motor such as, for example, a spring motor (not shown), a second end 214 for coupling to an end cover 216 as will be described in greater detail below, and an internal cavity 218 for housing the drive shaft 220, the driven shaft 240, the transmission cord 260, and the geared assembly 300. In one embodiment, the transmission 200 is arranged and configured as a stand-alone unit or module, the stand-alone unit or module including, inter alia, the housing 210, the drive shaft 220, the driven shaft 240, the transmission element or cord 260, and the geared assembly 300. In this manner, as will be described in greater detail, the transmission 200 can be installed as a unit or module and coupled to other components on opposite ends thereof such as, for example, a spring motor and a rotatable member.

In the illustrated embodiment, the drive shaft 220 includes a first end 222, a second end 224, and a central portion 226 extending between the first and second ends 222, 224. As illustrated, the central portion 226 may have a cylindrical shape although other shapes are envisioned such as, for example, a tapered shape depending on the desired transmission ratio, as will be described in greater detail below. The first end 222 includes an end portion 223 such as, for example, a non-circular end portion, for coupling to the power module (e.g., spring motor) for driving or rotating the drive shaft 220 so that rotation from the power module is transferred to the drive shaft 220, and vice-versa, although other suitable coupling mechanisms for connecting the drive shaft 220 to the spring motor may be incorporated. The second end 224 may include an end portion arranged and configured so that the second end 224 is rotatably coupled to the intermediate member or plate 310, as will be described in greater detail below. For example, in one embodiment, the second end 224 may include a circular-shaped end portion.

The driven shaft 240 includes a first end 242, a second end 244, and a tapered shaft portion 246 (e.g., the driven shaft 240 may also be referred to herein as a tapered driven shaft). By providing a tapered shaft portion 246, the output force of the transmission 200 can be adjusted so that, for example, the output force can be greater when the covering is in the retracted position and less when the covering is in the extended position. As illustrated, in one embodiment, the tapered shaft portion 246 includes a plurality of threads for receiving the transmission cord 260, as will be described in greater detail below. However, it should be understood that the driven shaft may include a smooth, intermediate shaft portion. In use, the driven shaft 240 is positioned parallel to the drive shaft 220 within the housing 210. The drive shaft 220 is operatively coupled to the driven shaft 240 via the transmission cord 260. For example, similar to the transmission 100 described above in connection with FIG. 1, the drive shaft 220 may include a small hole (not shown) adjacent to the first end 222 of the drive shaft 220 for receiving a first end of the transmission cord 260. In addition, the second end 244 of the driven shaft 240 may include a small hole (not shown) for receiving a second end of the transmission cord 260, although other mechanisms for coupling the transmission cord 260 to the drive shaft 220 and the driven shaft 240 are envisioned. Alternatively, as will be described in greater detail below, the transmission cord 260 can be pre-knotted and positioned (e.g., slid) onto the driven shaft 240. In use, the knotted transmission cord 260 can be held in position by the first gear 320 and/or the intermediate member or plate 310 when assembled.

In use, rotation of the drive shaft 220 causes the transmission cord 260 to wind and unwind, thus resulting in rotation of the driven shaft 240, and vice-versa. In this manner, similar to the transmission 100 described above in connection with FIG. 1, the transmission cord 260 is wound onto the tapered driven shaft 240 when the covering is in the extended position. As the covering is raised, the spring motor rotates and the drive shaft 220 rotates, which winds the transmission cord 260 onto the drive shaft 220, causing the tapered driven shaft 240 to rotate, which rotates the rotatable member. Conversely, when the covering is extended, the rotatable member rotates in the opposite direction. This in turn, rotates the tapered driven shaft 240 so as to wind up the transmission cord 260 onto itself, which rotates the drive shaft 220. Additionally, the power module (e.g., spring motor) rotates or winds so that it is available to assist in raising the covering, as previously described.

In contrast with the transmission 100 of FIG. 1, the illustrated transmission 200 according to the present disclosure includes a geared assembly 300. That is, as illustrated in the example embodiment, the transmission 200 includes an intermediate member or plate 310. In use, the intermediate member or plate 310 is coupled to the housing 210 and is arranged and configured to absorb and transfer any resulting axial loads from the first and second gears 320, 330 directly to the housing 210. As illustrated, the intermediate member or plate 310 may also be coupled to the end cover 216. The intermediate member or plate 310 may be coupled to the housing 210 and the end cover 216 by any suitable mechanism now known or hereafter developed. For example, as illustrated, the end cover 216 may include one or more projections 217 for coupling to the intermediate member or plate 310. Thereafter, the end cover 216 may include one or more extensions 225 for being received within one or more recesses 219 formed in the second end 214 of the housing 210 for coupling the end cover 216, and hence the geared assembly 300, to the housing 210. By coupling the intermediate member or plate 310 to the housing 210, any axial forces or loads from the first and second gears 320, 330 are transferred directly to the housing 210. As a result, the driven shaft 240 is subjected to reduced forces.

In the illustrated embodiment, the geared assembly 300 includes first and second intermeshed gears 320, 330. As shown the first and second gears 320, 330 may be positioned on the intermediate member or plate 310. That is, as shown, the intermediate member or plate 310 may include a first side 312 facing the drive shaft 220 and the driven shaft 240, and a second side 314 facing the end cover 216. The first and second gears 320, 330 may be positioned on the second side 314 of the intermediate member or plate 310.

In use, the first gear 320 is coupled to the driven shaft 240. The first gear 320 and the driven shaft 240 may be coupled by any suitable mechanism now known or hereafter developed. For example, as illustrated in the example embodiment, the first gear 320 may be keyed to the driven shaft 240. That is, for example, the first gear 320 may include or be coupled to a geared shaft 322 that extends through an opening formed in the intermediate member or plate 310. The geared shaft 322 may include a non-circular end portion 324 for coupling to the second end 244 of the driven shaft 240. In this manner, in contrast with the transmission 100 of FIG. 1, the first gear 320 may be separately formed and coupled to the driven shaft 240 (e.g., non-integrally formed with the driven shaft 240). As a result, as will be described below, the first and second gears 320, 330 may be manufactured using a precision manufacturing process, thus allowing the first and second gears 320, 330 to be manufactured as precision gears such as, for example, helical gears as opposed to, for example, less precise die cast gears made from zinc. As shown, the second end 244 of the driven shaft 240 may include a recess 245 for receiving and rotatably locking to the non-circular end portion 324 of the geared shaft 322, although other suitable mechanism for coupling the driven shaft 240 to the geared shaft 322 are envisioned. In use, rotation from the driven shaft 240 is transferred to the geared shaft 322, and hence the first gear 320, and vice-versa.

The second gear 330 is operatively coupled or intermeshed with the first gear 320. In addition, the second gear 330 is operatively associated with a first shaft 340 (the first shaft 340 may also be referred to as an input/output shaft). In use, the second gear 330 and the first shaft 340 may be integrally formed. Alternatively, the second gear 330 and the first shaft 340 may be separately formed and coupled together. In use, the end cover 216 includes an opening 221 through which the first shaft 340 is accessible so that the first shaft 340 may be coupled to the rotatable member of the architectural-structure covering (not shown) so that rotation from the first shaft 340 is transferred to the rotatable member, and vice-versa.

By positioning the first and second gears 320, 330 on the intermediate member or plate 310, alignment of the first and second gears 320, 330 with each other, and with other associated components, is assured. Additionally, by positioning the first and second gears 320, 330 on the intermediate member or plate 310 and coupling the intermediate member or plate 310 directly to the housing 210, forces on the driven shaft 240 from, for example, the architectural-structure covering (e.g., weight) are transferred from the intermediate member or plate 310 directly to the housing 210 thus minimizing the forces on the drive shaft 220 and the driven shaft 240 and thus binding of the drive shaft 220 and the driven shaft 240 is substantially minimized. Moreover, the disclosed arrangement enables a single geared assembly to be created, which is then coupled to the housing 210, thus simplifying manufacturing and assembly of the transmission.

Referring again to FIG. 2, in the illustrated embodiment, a bushing 370 may be provided adjacent to the first end 212 of the housing 210. In the non-limiting example embodiment, the bushing 370 is arranged and configured to be disposed on the outside of the housing 210 (e.g., not within the internal cavity 218 of the housing 210). In addition, the bushing 370 may be arranged and configured to mate or couple with the first ends 222, 242 of the drive shaft 220 and the driven shaft 240, respectively. Alternatively, it is envisioned that the bushing 370 may be integrally formed with the first end 212 of the housing 210.

In use, in one embodiment, with the covering in the extended position, the transmission cord 260 may be wound onto the driven shaft 240. Thereafter raising the covering causes the lift cords to wind, which in turn rotates the rotatable member, which rotates the first shaft 340, which rotates the second gear 330 and thus the first gear 320. This in turn rotates the driven shaft 240. Simultaneously, as described in greater detail below, the spring in the power module is wound so that, as the covering is moved from the extended position to the retracted position, the spring in the power module unwinds to assist in the raising of the covering, which rotates the drive shaft 220 causing the transmission cord 260 to wind about the drive shaft 220. Conversely, when the covering is in the retracted position, extension of the covering causes the lift cords to unwind causing the rotatable member to rotate in the opposite direction. This in turn, rotates the first shaft 340, the second gear 330, and the first gear 320 of the transmission 200 to rotate in the opposite direction, which causes the tapered driven shaft 240 to rotate so as to wind up the transmission cord 260 onto itself, which rotates the drive shaft 220.

Simultaneously, as will be appreciated by one of ordinary skill in the art, with the covering in the extended position, the spring in the power module is wound so that, as the covering is moved from the extended position to the retracted position, the spring in the power module unwinds to assist in the raising of the covering. Conversely, when the covering is in the retracted position, the spring in the power module is unwound so that, as the covering is moved from the retracted position to the extended position, the spring in the power module winds up to store energy to assist in the raising of the covering.

In accordance with various aspect of the present disclosure, an improved transmission 200 is provided. For example, by providing a simpler design with less components, the transmission 200 of the present disclosure is easier and faster to assemble as compared to known, prior art transmissions. Moreover, for example, by separating the first gear 320 from the driven shaft 240, and by placing the first and second gears 320, 330 onto an intermediate member or plate 310, the first and second gears 320, 330 may be manufactured using a precision manufacturing process, thus allowing the first and second gears 320, 330 to be manufactured as precision gears such as, for example, helical gears as opposed to, for example, less precise die cast gears made from zinc. Additionally, in accordance with one aspect of the present disclosure, the first and second gears 320, 330, along with the first shaft 340 and the intermediate member or plate 310 and end cover 216 can be manufactured and assembled as a geared assembly and thereafter, coupled to the housing 210 thus saving additional time and reducing complexity of the assembly process. In one embodiment, the first and second gears 320, 330 may be manufactured from plastic, although other suitable materials are envisioned.

In one example embodiment, by manufacturing a transmission in accordance with the principles disclosed herein, it has been discovered that smoother operation of the transmission is attainable. For example, as previously mentioned, by separating manufacture of the gears (e.g., separating the first gear 320 from the driven shaft 240), the first and second gears 320, 330 may be manufactured using a precision manufacturing process. This, in turn, enables the first and second gears 320, 330 to be manufactured as precision gears. That is, this enables the first and second gears 320, 330 to be manufactured from plastic, which can be precision molded. In addition, this enables the first and second gears 320, 330 to be helical gears. This is in contrast with known transmissions that utilized less precise die cast gears made from zinc. However, incorporation of precision molded, helical gears still resulted in the creation of axial loads being transferred to the first and second gears 320, 330, which tended to undesirably force the first and second gears 320, 330 apart. Incorporation of the intermediate member or plate 310 for mounting of the first and second gears 320, 330, enables the forces acting on the first and second gears 320, 330 to be isolated from the tapered driven shaft 240, thus minimizing or eliminating the forces that tend to separate the first and second gears 320, 330 during operation.

Additionally, by separating the first gear 320 from the tapered driven shaft 240, the transmission cord 260 can be pre-knotted and positioned (e.g., slid) onto the tapered driven shaft 240 as opposed to being threaded into a hole formed in the driven shaft 240. In use, the knotted transmission cord 260 is held in position by the first gear 320 and/or the intermediate member or plate 310 when assembled. This aids in the ease of assembly.

Additionally, by separating the first gear 320 from the tapered driven shaft 240, tighter tolerances can be achieved. Furthermore, by separating the first gear 320 from the tapered driven shaft 240 better lubricity can be attained (e.g., separating the first gear 320 from the tapered driven shaft 240 enables the gears and the tapered driven shaft 240 to be made from different materials). For example, the first gear 320 can be manufactured from a material having a higher lubricity than the material for the remaining components including, for example, the tapered driven shaft 240. In addition, the intermediate member or plate 310 can also act to align the ends of the first and second gears 320, 330 adjacent to the tapered driven shaft 240. As a result, in accordance with the various improvements disclosed herein, it has been found that an improved transmission can be provided.

In addition, by utilizing a one-piece, dual bushing 370, the bushing can be manufactured from a lubricated material thus eliminating the need to grease or lubricate the internal cavity 218 of the transmission 200 (e.g., an internal cavity of the housing 210 may be devoid of any grease).

Figure 3:
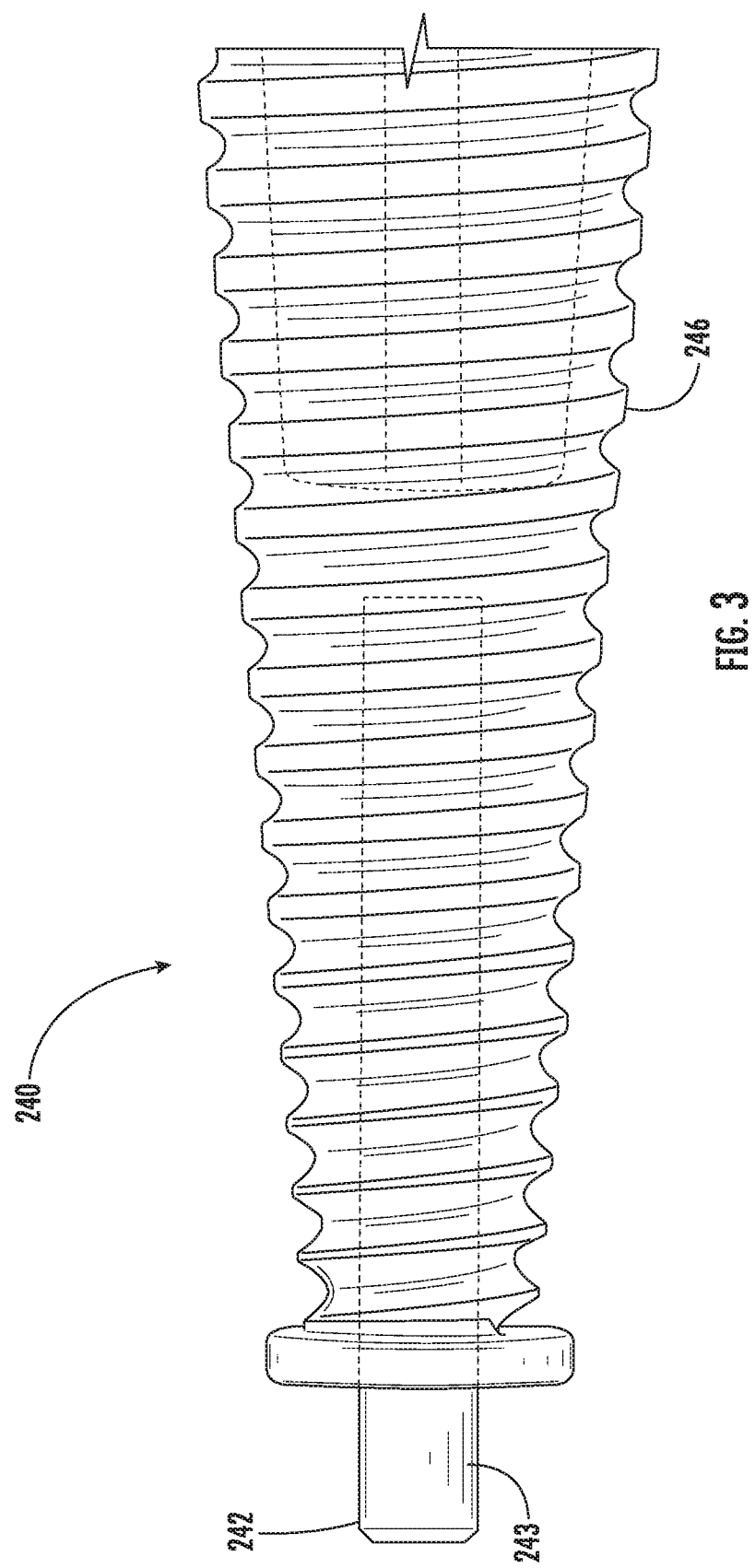
FIG. 3 is a partial side view of an example embodiment of a driven shaft that may be used with the transmission shown in FIG. 2.

The driven shaft 240 may be manufactured from any suitable material now known or hereafter developed including, for example, zinc or the like. Alternatively, referring to FIG. 3, in one example embodiment, the driven shaft 240 may be manufactured from two pieces. For example, the first end 242 of the driven shaft 240 may be in the form of a steel pin 243. In use, the steel pin 243 may be molded into the tapered shaft portion 246 of the driven shaft 240 or it may be inserted into the tapered shaft portion 246 post-molding. Manufacturing the driven shaft 240 from two pieces enables an improved bearing surface between the first end 242 (e.g., steel pin 243) of the driven shaft 240 and the bushing 370 (the first end 242 of the driven shaft 240 is formed by the outer diameter of the steel pin 243 as compared to a zinc end portion). In addition, manufacturing the driven shaft 240 from two pieces enables the tapered shaft portion 246 of the tapered driven shaft 240 to be manufactured from a more precision process such as, for example, a plastic component instead of zinc.

In accordance with another aspect of the present disclosure, by modifying the taper angle of the tapered driven shaft 240, one can better control operation of the architectural-structure covering. That is, by adjusting or modifying the taper angle of the tapered driven shaft 240, performance of the covering during extension and retraction can be optimized. For example, in connection with the prior art transmission 100 described in connection with FIG. 1, it was discovered that when the covering was in a fully extended position, the spring motor would act to retract or pull up on the covering, which, in turn, could lead to undesirable operation and unwanted aesthetics. To prevent this, additional weight was added to the covering to counteract the forces from the spring motor. In one embodiment, additional weight was provided by adding additional cells to the covering. However, in accordance with one aspect of the present disclosure, by adjusting the tapered angle of the tapered driven shaft 240, the tapered driven shaft 240 can be employed to counter the force of the spring motor, thereby eliminating the need to provide extra weight to the covering. Alternatively, in one embodiment, the taper of the tapered driven shaft 240 may remain constant and the drive shaft 220 may be tapered. By changing the taper angle of the drive shaft 220, a single constant tapered driven shaft 240 can be manufactured and tooled. In use, varying the taper of the drive shaft 220 can be utilized to counter the force of the spring motor, thereby eliminating the need to provide extra weight to the covering and eliminating the need to manufacture and tool multiple tapered driven shafts 240. In use, manufacturing multiple drive shafts 220 with varying tapers is less expensive as compared to manufacturing and tooling multiple tapered driven shafts 240 due to the more complex geometry associated with the driven shaft 240.

As will be generally appreciated by one of ordinary skill in the art, a transmission may be contained within a fully contained module or housing. In this manner, the transmission may be readily interconnected to satisfy the requirements of a multitude of different architectural-structure coverings. Each module may be easily and readily installed, mounted, replaced, removed, and interconnected within the architectural-structure covering. Each housing may include a mounting mechanism for its module and removal of the housing also removes all the individual components contained therein. In use, individual modules may be removed and replaced with other modules which fit in the same location and have the same method of interconnection and installation, but which have different performance characteristics. For instance, interchangeable transmission modules may have different transmission ratios, or may even be a different type of transmission than the ones disclosed in this specification such a gear-type transmission.

The foregoing description has broad application. Accordingly, the discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority but are used to distinguish one feature from another. The drawings are for purposes of illustration only and the dimensions, positions, order and relative sizes reflected in the drawings attached hereto may vary.

The invention claimed is:

1. A transmission for use with an architectural-structure covering, the transmission being arranged and configured to move a covering of the architectural-structure covering between an extended position and a retracted position, the transmission comprising:
   a housing;
   a drive shaft positioned within the housing;
   a driven shaft positioned within the housing, the driven shaft including a tapered shaft portion;
   a transmission element coupled to the drive shaft and the driven shaft, the transmission element being arranged and configured to transfer rotation between the drive shaft and the driven shaft; and
   a geared assembly coupled to a second end of the driven shaft; the geared assembly including:
      an intermediate member;
      a first gear coupled to the intermediate member;
      a second gear coupled to the intermediate member and intermeshed with the first gear;
      an input/output shaft coupled to the second gear; and
      an end cover coupled to the intermediate member and the housing;
      wherein the geared assembly is arranged and configured to couple to the second end of the driven shaft.

2. The transmission of claim 1, wherein the transmission is arranged and configured as a stand-alone module.

3. The transmission of claim 1, wherein the drive shaft includes a first end, a second end, and a central portion extending between the first and second ends, the second end of the drive shaft being rotatably coupled to the intermediate member.

4. The transmission of claim 3, wherein the central portion of the drive shaft includes a tapered shaft portion.

5. The transmission of claim 1, wherein the driven shaft includes a first end, the second end, and the tapered shaft portion, the second end of the driven shaft including a recess arranged and configured to receive a non-circular end portion of a geared shaft operatively coupled to the first gear.

6. The transmission of claim 1, wherein the driven shaft is manufactured from first and second pieces.

7. The transmission of claim 6, wherein the first piece includes the tapered shaft portion and the second piece includes the first end, the tapered shaft portion being manufactured from a plastic, the first end being a steel pin coupled to the tapered shaft portion.

8. The transmission of claim 1, wherein the intermediate member is arranged and configured to transfer any resulting axial loads from the first and second gears to the housing.

9. The transmission of claim 1, wherein the end cover includes one or more projections arranged and configured to couple to the intermediate member.

10. The transmission of claim 9, wherein the end cover includes one or more extensions arranged and configured to couple to one or more recesses formed in the housing to couple the end cover and the geared assembly to the housing.

11. The transmission of claim 1, wherein the first gear includes a geared shaft arranged and configured to couple to the driven shaft.

12. The transmission of claim 11, wherein the intermediate member includes an opening, the geared shaft being accessible through the opening formed in the intermediate member to couple to the driven shaft.

13. The transmission of claim 12, wherein the geared shaft includes a non-circular end portion arranged and configured to couple to a recess formed in an end of the driven shaft.

14. The transmission of claim 1, wherein a bushing operatively coupled to a first end of the drive shaft and a first end of the driven shaft.

15. The transmission of claim 14, wherein the bushing is positioned adjacent to a first end of the housing, the bushing being positioned outside of the housing.

16. The transmission of claim 14, wherein the bushing is manufactured from a lubricated material.

17. The transmission of claim 1, wherein the housing includes an internal cavity, the internal cavity of the housing being devoid of any grease.

18. The transmission of claim 1, wherein the first and second gears are helical gears.

19. A transmission for use with an architectural-structure covering, the transmission being arranged and configured to move a covering of the architectural-structure covering between an extended position and a retracted position, the transmission comprising:
   a housing;
   a driven shaft positioned within the housing, the driven shaft including a tapered shaft portion; and
   a geared assembly operatively coupled to a second end of the driven shaft and to the housing;
   wherein the geared assembly is arranged and configured to couple to the second end of the driven shaft; and
   wherein the geared assembly includes an intermediate member; a first gear coupled to the intermediate member; a second gear coupled to the intermediate member and intermeshed with the first gear; an input/output shaft coupled to the second gear; and an end cover coupled to the intermediate member and the housing.

* * * * *